United States Patent
Boutami (10) Patent No.: US 11,209,352 B2
(45) Date of Patent: Dec. 28, 2021

(54) DEVICE FOR DETECTING GASES OR PARTICLES AND METHOD FOR MANUFACTURING SUCH A DEVICE

(71) Applicant: COMMISSARIAT A L'ENERGIE ATOMIQUE ET AUX ENERGIES ALTERNATIVES, Paris (FR)

(72) Inventor: Salim Boutami, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 254 days.

(21) Appl. No.: 16/475,201

(22) PCT Filed: Dec. 12, 2017

(86) PCT No.: PCT/EP2017/082438
§ 371 (c)(1),
(2) Date: Jul. 1, 2019

(87) PCT Pub. No.: WO2018/121982
PCT Pub. Date: Jul. 5, 2018

(65) Prior Publication Data
US 2019/0339197 A1   Nov. 7, 2019

(30) Foreign Application Priority Data
Jan. 2, 2017   (FR) ...................................... 1750004

(51) Int. Cl.
*G01N 21/35* (2014.01)
*G01N 21/3504* (2014.01)
(Continued)

(52) U.S. Cl.
CPC ....... *G01N 21/3504* (2013.01); *G01N 29/032* (2013.01); *G01N 2015/0693* (2013.01); *G01N 2021/1704* (2013.01); *G01N 2201/08* (2013.01)

(58) Field of Classification Search
CPC ............. G01N 21/3504; G01N 29/032; G01N 2015/0693; G01N 2021/1704; G01N 2021/08
See application file for complete search history.

(56) References Cited

FOREIGN PATENT DOCUMENTS

DE    101 44 808 A1    3/2003
EP    2 515 096 A1    10/2012
(Continued)

OTHER PUBLICATIONS

International Search Report as issued in International Patent Application No. PCT/EP2017/082438, dated Jan. 30, 2018.

*Primary Examiner* — Tarun Sinha
(74) *Attorney, Agent, or Firm* — Pillsbury Winthrop Shaw Pittman LLP (57) ABSTRACT

A device for detecting gases or particles includes a light source capable of emitting a light beam, an interaction cavity including first and second reflective walls substantially parallel with each other, a plurality of monomode optical waveguides each having a first end of width l1 optically coupled to the light source and a second end of width l2, greater than the width l1, optically coupled to a first end of the interaction cavity, each optical waveguide including in its second end of width l2 a diffraction grating having a pitch P in particular chosen as a function of a concentration C and a parameter α of interaction with the light beam of a type of gas or particle to detect; and a detector coupled to a second end of the interaction cavity.

11 Claims, 9 Drawing Sheets

(51) Int. Cl.
    *G01N 29/032*    (2006.01)
    *G01N 15/06*    (2006.01)
    *G01N 21/17*    (2006.01)

(56) References Cited

FOREIGN PATENT DOCUMENTS

DEVICE FOR DETECTING GASES OR PARTICLES AND METHOD FOR MANUFACTURING SUCH A DEVICE

CROSS REFERENCE TO RELATED APPLICATIONS

This application is the U.S. National Stage of PCT/EP2017/082438, filed Dec. 12, 2017, which in turn claims priority to French Patent Application No. 1750004 filed Jan. 2, 2017, the entire contents of all applications are incorporated herein by reference in their entireties.

TECHNICAL FIELD OF THE INVENTION

The technical field of the invention is that of the detection of gases or particles. An aspect of the present invention relates to a device for detecting gases or particles, and in particular a device for detecting gases or particles by interaction with a light beam. A gas is composed of distinct molecules, of sub-nanometric size. A particle is solid, composed of molecules integral with each other. The total size of a particle exceeds a nanometre, or even a micrometre. Another aspect of the invention relates to a method for manufacturing such a detection device.

TECHNOLOGICAL BACKGROUND OF THE INVENTION

The aim of a detector is generally not only to determine the presence or not of a given element, but also, in the event of presence of this element, to determine its concentration.

To detect gases or particles, it is in particular possible to use a light attenuation detector or a photoacoustic detector. A light attenuation detector is based on a light absorption or scattering property of an element to detect: a part of the light beam interacting with the element to detect is absorbed or scattered by the element to detect. This leads to an attenuation of the light beam that is measured by a light detector. In a photoacoustic detector, a light source variable over time, such as a pulsed or amplitude or wavelength modulated laser, interacts with the element to detect. The energy absorbed by the element to detect is restored in the form of a transitory heating which generates a pressure wave, itself measured by an acoustic detector.

For the types of detectors mentioned previously, an important parameter is the length of interaction of the light with the element to detect. For example, in the case of a light absorption detector, if the gas absorbs too little light, one cannot be sure that it is present. If on the other hand the gas absorbs too much light, its concentration cannot be defined with certainty because any concentration above a certain threshold may lead to a total absorption and to an absence of signal at the detector. Similarly, in the case of a detector of particles by light scattering, if the particles scatter too little light, one cannot be sure that they are present and if, on the other hand, they scatter too much light, their concentration cannot be decided with certainty. It thus involves precisely controlling the length of interaction of the light with the element to detect, as a function of the type of element to detect and its concentration: for a given type of element to detect, an interaction length is chosen that is all the greater the lower the concentration of the element to detect.

To maximise light-matter interaction and thus enable the detection of low concentrations of gases or particles, it is in particular known to confine the light and the element to detect in a hollow cavity with reflective walls.

The use of monomode hollow cavities, in which the light follows a single path, makes it possible to control the length of interaction of the light with the element to detect and thus to dimension precisely a device for the detection of a certain range of concentrations. However, such monomode cavities are thin and the light that they confine undergoes very numerous reflections, which brings about undesirable signal losses. The alternative use of multimode hollow cavities, larger, brings about fewer losses but does not make it possible to control precisely the length of interaction of the light with the gas because the light then propagates along several different paths.

Furthermore, the devices for detecting gases or particles of the prior art can only be dimensioned for the detection of a single type of gas or particle, over a restricted range of concentration $[c_{min}; c_{max}]$, that is to say for which $c_{max}/c_{min} \leq 10$.

SUMMARY OF THE INVENTION

The invention offers a solution to the aforementioned problems, by proposing a device for detecting at least one type of gas or particle over a wide range of concentration $[c_{min}; c_{max}]$ such that $c_{max}/c_{min} > 10$, or of a plurality of different types of gas or particle at least over a restricted range of concentration $[c_{min}; c_{max}]$, the device making it possible to control a length of interaction of the light with each element to detect according to its type and its concentration, while minimising the number of reflections of the light.

An aspect of the invention thereby relates to a device for detecting gases or particles comprising:
  a light source capable of emitting a light beam at at least one wavelength,
  a cavity for interaction of gases or particles with the light beam comprising first and second reflective walls substantially parallel with each other and facing each other,
  a plurality of monomode optical waveguides each having a first end of width l1 optically coupled to the light source and a second end of width-l2, greater than the width l1, optically coupled to a first end of the interaction cavity, each optical waveguide comprising in its second end of width l2 a diffraction grating having a distinct pitch P chosen as a function of the wavelength λ of the light beam propagated in the optical waveguide associated with said diffraction grating, the cladding index n of the optical waveguide associated with the diffraction grating, the effective index $n_{eff}$ of the mode propagated in the optical waveguide associated with the diffraction grating, the length L and the height H of the cavity, the reflection rate R of the first and second reflective walls of the cavity for the light beam at the wavelength λ, a concentration C of a type of gas or particle to detect and a parameter α of interaction of the type of gas or particle to detect with the light beam;
  and a detector coupled to a second end of the interaction cavity.

"Width" of an end of a waveguide is taken to mean a first dimension that lies in a plane of propagation of the light beam in the waveguide and which is perpendicular to a direction of propagation of the light beam in the waveguide. "Propagation plane" is taken to mean a plane to which belongs the direction of propagation of the light beam in the waveguide. "Length" of the cavity is taken to mean a second dimension that lies in the plane of propagation of the light beam in the waveguide and which is parallel to the direction of propagation of the light beam in the waveguide. The second length dimension is thus perpendicular to the first width dimension defined previously. "Height" of the cavity is taken to mean a third dimension which is perpendicular to the first width dimension and to the second length dimension.

Thanks to the invention, the pitch P of each diffraction grating is chosen in such a way that the light beam of wavelength λ diffracted by said diffraction grating takes a path within the interaction cavity which is optimised for a particular type of element to detect, thanks to the interaction parameter α, and for a particular concentration C of the element to detect. The enlargement of the second end of each waveguide decreases or even eliminates the diffraction of the light beam in the direction parallel to this width, and the diffraction grating arranged in the second end of each waveguide diffracts the light beam in a specific direction at the output of the waveguide. The direction in which the light propagates at the output of the waveguide is thus precisely controlled, and this direction is chosen to optimise a length of interaction with an element to detect, as a function of the type and of the concentration of this element. The element to detect is either a type of gas, or a type of particle.

Apart from the characteristics that have been mentioned in the preceding paragraph, the device for detecting gases or particles according to an aspect of the invention may have one or more complementary characteristics among the following, considered individually or according to all technically possible combinations thereof:

The pitch P is chosen so as to minimise the norm of the following equation:

$$f(P) = \ln\left(1 + \frac{\alpha HC}{\sqrt{n^2 - \left(n_{\textit{eff}} - \frac{\lambda}{P}\right)^2} \ln\left(\frac{1}{R}\right)}\right) \sqrt{1 - n^2 + \left(n_{\textit{eff}} - \frac{\lambda}{P}\right)^2} - \alpha LC$$

"Minimising the norm of the equation f(P)" is taken to mean the fact of making f(P) the closest possible to zero. By choosing the pitch P of each diffraction grating to minimise the norm of the function f, it is guaranteed that the light beam of wavelength λ diffracted by said diffraction grating takes a path within the interaction cavity that is optimised for a particular type of element to detect, thanks to the interaction parameter α, and for a particular concentration C of the element to detect.

The device for detecting gases or particles advantageously comprises at least one first diffraction grating having a first pitch, and a second diffraction grating having a second pitch distinct from the first pitch. At least two different interaction lengths are thereby obtained between the light beam and the element to detect within the interaction cavity, each interaction length being able to be adapted precisely to a type and a concentration of element to detect.

Each monomode optical waveguide having a core layer intercalated between first and second clad layers, the device for detecting gases or particles advantageously comprises a reflective layer in the extension of the second reflective wall, and the first cladding layer is advantageously arranged on said reflective layer while having a thickness e such that:

$$\frac{\lambda_{av}}{8n} \le e \le \frac{3\lambda_{av}}{8n}$$

where $\lambda_{av}$ is the average wavelength of all the wavelengths used and n is the index of the first cladding layer. Thus, the light rays extracted from a given diffraction grating and which penetrates into the cavity all have the same extraction angle and all follow the same optical path while being in constructive interference with each other.

The device for detecting gases or particles comprises first and second vents communicating with the interaction cavity. An improved circulation of a flow of gases or particles in the interaction cavity is thereby enabled.

The device for detecting gases or particles is advantageously such that:
the interaction cavity is an optical cavity,
the detector is a light detector and is arranged substantially parallel to the reference plane, in the plane of the first reflective wall,
the pitch P of each diffraction grating further belongs to the series $(P_m)$, with m a natural integer, such that:

$$P_m = \frac{\lambda}{n_{\textit{eff}} - \sqrt{n^2 - \frac{(2m+1)^2}{(2m+1)^2 + \left(\frac{L}{H}\right)^2}}}$$

the diffraction gratings extend substantially along a same plane and each diffraction grating of pitch P has a plurality of structures parallel with each other, spaced apart by the pitch P, and perpendicular to a radial direction relative to the light detector.

It is thereby guaranteed that the light beam ends up at the detector, when the detector is arranged in the plane of the first reflective wall. This enables a detection by light attenuation.

Alternatively, the device for detecting gases or particles is advantageously such that:
the interaction cavity is an optical cavity,
the detector is a light detector and is arranged substantially parallel to the reference plane, in the plane of the second reflective wall,
the pitch P of each diffraction grating further belongs to the series $(P_m)$, with m a natural integer, such that:

$$P_m = \frac{\lambda}{n_{\textit{eff}} - \sqrt{n^2 - \frac{(2m+2)^2}{(2m+2)^2 + \left(\frac{L}{H}\right)^2}}}$$

the diffraction gratings extend substantially along a same plane and each diffraction grating of pitch P has a plurality of structures parallel with each other, spaced apart by the pitch P, and perpendicular to a radial direction relative to the light detector.

It is thereby guaranteed that the light beam ends up in the detector, when the detector is arranged in the plane of the second reflective wall. This enables a detection by light attenuation.

The parameter of interaction of the type of gas or particle to detect with the light beam is an absorptivity parameter α and the light source is capable of emitting a light beam at at least one first wavelength corresponding to an absorption wavelength of a first gas to detect, and at at least one second wavelength distinct from the first wavelength and corresponding to an absorption wavelength of a second gas to detect. An optimised detection for at least two different gases to detect is thereby enabled.

Another aspect of the invention relates to a method for manufacturing a device for detecting gases or particles comprising a light source capable of emitting a light beam at at least one wavelength λ, a cavity for interaction of gases or particles with the light beam comprising first and second reflective walls substantially parallel with each other, a plurality of monomode optical waveguides each having a first end of width l1 optically coupled to the light source and a second end of width l2, greater than the width l1, optically coupled to a first end of the interaction cavity, and a detector coupled to a second end of the interaction cavity, the method comprising at least the following steps:

in a first part of a first substrate, producing the plurality of monomode optical waveguides, each optical waveguide comprising a core layer intercalated between first and second cladding layers, as well as a diffraction grating arranged at an interface between the core layer and one of the first or second cladding layers, each diffraction grating having a distinct pitch P chosen as a function of the wavelength λ of the light beam propagated in the optical waveguide associated with said diffraction grating, the cladding index n of the optical waveguide associated with the diffraction grating, the effective index $n_{\mathit{eff}}$ of the mode propagated in the optical waveguide associated with the diffraction grating, the length L and the height H of the cavity, the reflection rate R of the first and second reflective walls of the cavity for the light beam at the wavelength λ, a concentration C of a type of gas or particle to detect and a parameter α of interaction of the type of gas or particle to detect with the light beam;

depositing a first reflective layer on the plurality of optical waveguides produced in the first part of the first substrate and on a second part of the first substrate;

etching, in the second part (sp2) of the first substrate, a cavity emerging on the first reflective layer;

on a second substrate, depositing a second reflective layer;

etching, in the second reflective layer and in the second substrate, a location intended to receive the detector;

assembling the first and second substrates in such a way that:
the first and second reflective layers are facing each other,
the location intended to receive the detector lies directly in line with the cavity,
the plurality of optical waveguides lies between the first and second reflective layers.

Apart from the characteristics that have been described in the preceding paragraph, the manufacturing method according to an aspect of the invention may have one or more complementary characteristics among the following, considered individually or according to all technically possible combinations thereof:

The method may comprise, after the step of etching, in the second part of the first substrate, a cavity emerging on the first reflective layer, a step of depositing, on the first substrate forming a wall of the previously etched cavity, a first antireflective layer; and the step of etching the location intended to receive the detector may comprise the following three sub-steps:

etching, in the second reflective layer, a first location emerging on the second substrate;

depositing, on the second substrate emerging in the first location, a second antireflective layer;

etching, in the second substrate, a second location intended to receive the detector.

The method may further comprise:

a step of etching, in the second part of the first substrate, at least first and second vents emerging on the cavity etched in the second part of the first substrate;

after the assembly of the first and second substrates, a step of etching the second substrate so as to emerge on the first and second vents, without emerging on the cavity.

The invention and its different applications will be better understood on reading the description that follows and by examining the figures that accompany it.

BRIEF DESCRIPTION OF THE FIGURES

The figures are presented for indicative purposes and in no way limit the invention.

DETAILED DESCRIPTION OF AT LEAST ONE EMBODIMENT OF THE INVENTION

Unless stated otherwise, a same element appearing in the different figures has a single reference.

Figure 1:
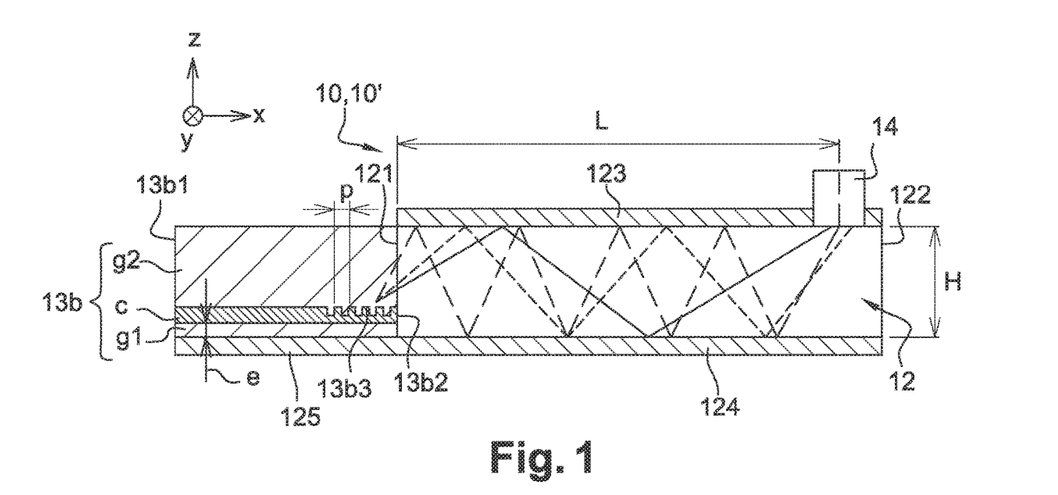
FIG. 1 shows a schematic sectional view of a device for detecting gases or particles according to a first or a second embodiment of the invention.
Figures 2A, 2B:
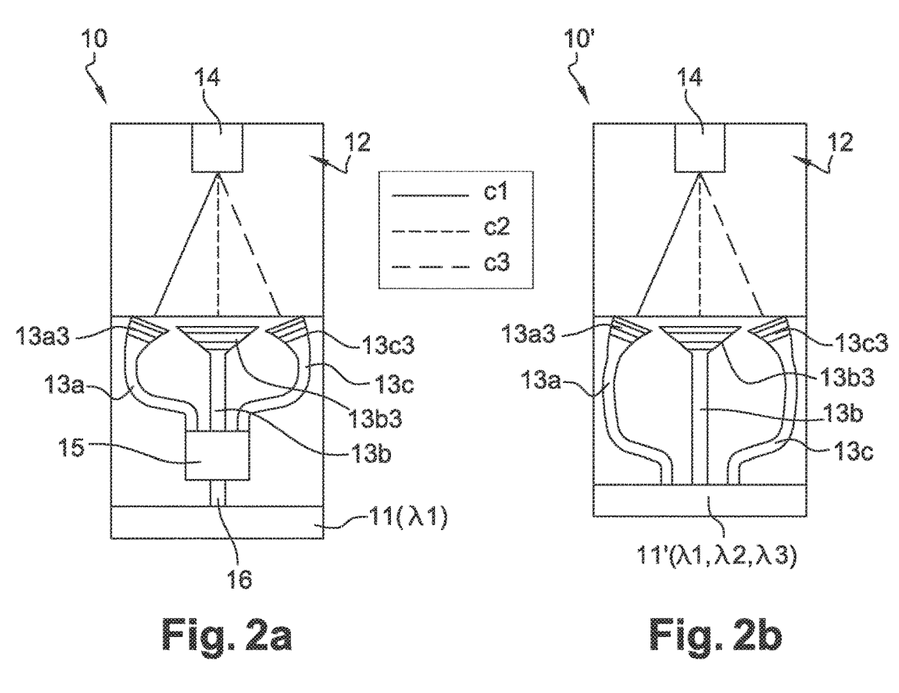
FIG. 2a shows a schematic top view of a device for detecting gases or particles according to a first embodiment of the invention.
FIG. 2b shows a schematic top view of a device for detecting gases or particles according to a second embodiment of the invention.

FIG. 1 shows a schematic sectional view of a device for detecting gases or particles 10 according to a first embodiment of the invention, or 10' according to a second embodiment of the invention. FIG. 2a shows a schematic top view of the device for detecting gases or particles 10 according to the first embodiment of the invention. FIG. 2b shows a schematic top view of the device for detecting gases or particles 10' according to the second embodiment of the invention. FIGS. 1, 2a and 2b are described jointly.

The device for detecting gases or particles 10 according to the first embodiment or 10' according to the second embodiment comprises:
- a light source 11, 11' for the emission of a light beam,
- a cavity 12 for interaction of gases or particles with the light beam, of length L and of height H, comprising a first reflective wall 123 and a second reflective wall 124 substantially parallel with each other and having a reflection rate R,
- a plurality of monomode optical waveguides, for example first, second and third monomode optical waveguides 13a, 13b, 13c, coupled to a first end 121 of the interaction cavity 12, and
- a detector 14 coupled to a second end 122 of the interaction cavity 12.

The plurality of monomode optical waveguides could alternatively comprise only two monomode optical waveguides, or four monomode optical waveguides or more.

Each monomode optical waveguide 13a, 13b, 13c is a solid guide, comprising a solid core surrounded by a cladding. In particular, each monomode optical waveguide 13a, 13b, 13c typically has a core layer c intercalated between first and second cladding layers g1, g2. Each monomode optical waveguide 13a, 13b, 13c has:
- a first end 13a1, 13b1, 13c1 of width l1 which is optically coupled to the light source 11, 11', and
- a second end 13a2, 13b2, 13c2 of width l2 greater than the width l1 which is optically coupled to a first end 121 of the interaction cavity 12.

Each optical waveguide 13a, 13b, 13c comprises, in its second end of width l2, a diffraction grating 13a3, 13b3, 13c3 having a pitch P chosen to minimise the norm of the following equation f:

$$f(P) = \ln\left(1 + \frac{\alpha HC}{\sqrt{n^2 - \left(n_{\text{eff}} - \frac{\lambda}{P}\right)^2} \ln\left(\frac{1}{R}\right)}\right) \sqrt{1 - n^2 + \left(n_{\text{eff}} - \frac{\lambda}{P}\right)^2} - \alpha LC$$

where:
- $\lambda$ is the wavelength of the light beam propagated in the optical waveguide associated with said diffraction grating,
- n is the cladding index of the optical waveguide associated with said diffraction grating,
- $n_{\text{eff}}$ is the effective index of the mode propagated in the optical waveguide associated with the diffraction grating,
- C is the concentration of the type of gas or particle to detect, and
- $\alpha$ is a parameter of interaction of the type of gas or particle to detect with the light beam.

In the example of FIG. 1, the widths l1 and l2 of the waveguide 13b are measured along an axis y, the length L of the cavity 12 and the pitch P of the diffraction grating 13b3 are measured along an axis x and the height H of the cavity 12 is measured along an axis z, the axes x, y and z being perpendicular with each other. The length L is defined between the first end 121 and the middle of the detector 14. The diffraction gratings 13a3, 13b3, 13c3 of FIGS. 1, 2a, 2c are arranged substantially parallel to a same plane (Oxy) defined by the axes x and y.

A first part of the light rays diffracted by each diffraction grating is typically oriented upwards, that is to say towards the first reflective wall 123, whereas a second part of the light rays diffracted by each diffraction grating is oriented downwards, that is to say to the second reflective wall 124, with, in absolute value, the same extraction angle as the first part of the light rays. This situation may have the drawback that several optical paths cohabit in the cavity for a same wavelength, and/or that a part of the light rays extracted from each diffraction grating does not penetrate into the cavity or does not reach the detector and is lost. To remedy the situation, the first cladding layer g1 is advantageously arranged on a reflective layer 125 and has a thickness e such that:

$$\frac{\lambda_{av}}{8n} \leq e \leq \frac{3\lambda_{av}}{8n}$$

where $\lambda_{av}$ is the average wavelength of all the wavelengths used and n is the index of the first cladding layer g1. The light rays extracted "downwards", that is to say towards the reflective layer 125, are reflected on the reflective layer 125 and leave in the same direction as the light rays extracted "upwards", that is to say towards the first reflective wall 123, while being in constructive interference therewith given the choice of the thickness e, of optical thickness close to the quarter of the average wavelength. The light rays extracted from a given diffraction grating and which penetrate into the cavity thus all have the same extraction angle and all follow the same optical path, because the low thickness e also makes it possible to avoid a significant lateral shift between the reflected and non-reflected rays. Moreover, the phenomenon of constructive interference makes it possible to optimise the power of the light source.

The thickness e of the first cladding layer g1 is preferentially substantially equal to $\lambda_{av}/4n$.

The thickness of the second cladding layer g2 is typically chosen in such a way that the total thickness of each waveguide is substantially equal to the height H of the cavity. The second cladding layer g2 is thereby typically at least 5 times thicker, or even at least 10 times thicker, or even at least 100 times thicker than the first cladding layer g1. In the example of FIG. 1, the thickness of the first and second cladding layers g1, g2 as well as the thickness of the optic guides are measured along the axis z. The reflective layer 125 and the second reflective wall 124 may form a single reflective element, or alternatively be two distinct reflective elements arranged in the extension of each other.

Generally speaking, the choice of the pitch determines the length of the light-matter interaction and a path is chosen that is all the shorter the higher the concentration of the element to detect, and all the longer the lower the concentration of the element to detect. In the example of FIGS. 1, 2a and 2b, the diffraction grating 13a3 is associated with a first optical path c1; the diffraction grating 13b3 is associated with a second optical path c2 longer than the first optical path c1; the diffraction grating 13c3 is associated with a third optical path c3 longer than the first and second optical paths c1, c2.

In the case of gas detection, the interaction parameter α is typically an absorptivity of a type of gas to detect. In the case of particle detection, the interaction parameter α is typically a diffusivity of a type of particle to detect. Generally speaking, any element having absorption properties may be directly detected by means of a detection device by light attenuation or by means of a detection device by photoacoustic effect; any element having diffusivity properties may be directly detected by means of a detection device by light attenuation, but not by means of a detection device by photoacoustic effect.

In the case of a detection device by light attenuation:
the interaction cavity is an optical cavity,
the detector 14 is a light detector such as a photomultiplier, a photodiode, or a thermal detector.
each diffraction grating, which comprises a plurality of patterns parallel with each other and spaced apart by a pitch P, is oriented within the plane (Oxy) in such a way that its plurality of patterns is perpendicular to a radial direction relative to the detector 14—in FIGS. 2a and 2b, the first, second and third optical paths c1, c2, c3 are represented along a radial direction relative to the detector 14, and
the pitch P of each diffraction grating belongs to the series $(P_m)$, with m a natural integer, such that:

$$P_m = \frac{\lambda}{n_{eff} - \sqrt{n^2 - \frac{(2m+1)^2}{(2m+1)^2 + \left(\frac{L}{H}\right)^2}}}$$

In the case of a detection device by light attenuation, the pitch P of each diffraction grating is thus advantageously the member of the series $(P_m)$ that minimises the norm of the function f. It is thereby guaranteed that all the optical paths end up at the detector 14, while optimising the sensitivity of the detection device for particular experimental conditions.

In the case of a detection device by photoacoustic effect, the detector 14 is an acoustic detector such as a microphone and the orientation of the different diffraction gratings is indifferent. The pitch P of each diffraction grating is thus advantageously chosen such that f(P)=0.

According to the first embodiment, the light source 11 emits a light beam at a single wavelength, and the optical coupling between each monomode optical waveguide and the light source 11 is achieved via a multimode interferometer. FIG. 2a illustrates in particular an example conforming to the first embodiment, according to which:
the light source 11 emits a light beam at a single wavelength $\lambda_1$,
the optical coupling between each monomode optical waveguide 13a, 13b, 13c and the light source 11 is achieved via a multimode interferometer 15, and
the optical coupling between the light source 11 and the multimode interferometer 15 is achieved via an input guide 16.

The detection device 10 according to the first embodiment advantageously makes it possible to detect a same type of element, characterised by its absorption properties or by its diffusion properties, over a wide continuous or discontinuous range of concentration $[c_{min}; c_{max}]$ such that $c_{max}/c_{min} \geq 10^k$ with k the number of diffraction gratings, by choosing for each diffraction grating 13a3, 13b3, 13c3 a pitch adapted to a certain restricted range of concentration of the type of element to detect, the reunion of the restricted ranges of concentration forming the continuous or discontinuous range of concentration. Each restricted range of concentration typically extends over an interval $[c_{Rmin}; c_{Rmax}]$ such that $c_{Rmax}/c_{Rmin} \leq 10$. When the restricted ranges of concentration are contiguous or even partially overlap, their reunion forms a wide continuous range of concentration. When the restricted ranges of concentration are disjointed and thus do not overlap, their reunion forms a wide discontinuous range of concentration. This latter case has in particular an interest for the detection of a same type of element at very different concentrations: for example, the detection of a same type of element in two very different applications, such as an industrial emanation or the quality of ambient air. The detection device 10 according to the first embodiment of the invention alternatively makes it possible to detect several types of different elements characterised by their diffusion properties, over a given restricted range of concentration, by choosing for each diffraction grating 13a3, 13b3, 13c3 a pitch adapted to each type of element over a considered restricted range of concentration.

According to an alternative of the first embodiment, the detection device 10 comprises at least a first plurality and a second plurality of optical waveguides such as described previously, the pitches of the diffraction gratings of the first plurality of waveguides being chosen to enable the detection of a first type of element characterised by its diffusion properties over a wide range of concentration such as described previously, and the pitches of the diffraction gratings of the second plurality of waveguides being chosen to enable the detection of a second type of element characterised by its diffusion properties over a wide range of concentration such as described previously.

According to the second embodiment, the light source 11' emits a light beam at at least two distinct wavelengths, each wavelength corresponding to an absorption wavelength of an element to detect, and each monomode optical waveguide is directly coupled to the light source 11'. FIG. 2b illustrates in particular an example conforming to the second embodiment, according to which:
the light source 11' emits a light beam at at least three distinct wavelengths $\lambda_1$, $\lambda_2$ and $\lambda_3$, each wavelength corresponding to an absorption wavelength of an element to detect,
each monomode optical waveguide 13a, 13b, 13c is directly coupled to the light source 11'.

The light source 11' according to the second embodiment could alternatively emit a light beam only at at least two distinct wavelengths $\lambda_1$ and $\lambda_2$, or at four distinct wavelengths or more. The light source 11' according to the second embodiment may comprise a plurality of distinct sources, each distinct source emitting a light beam at a single wavelength. In this case, each waveguide is coupled to a single source and receives a single wavelength. According to this case, the light source is preferentially a multi-wavelength QCL (Quantum Cascade Laser) bar. Alternatively, the light source 11' according to the second embodiment may be a single light source that is wavelength tuneable over time. In this alternative, the tuneable source is coupled to all the waveguides, and each waveguide receives the plurality of wavelengths emitted by the tuneable source. The instant of detection, the wavelength injected at this instant and thus the element measured at this instant are then deduced.

The device for detecting gases or particles 10' according to the second embodiment advantageously makes it possible to detect several types of different elements characterised by their absorption properties over a certain restricted range of concentration $[c_{min}; c_{max}]$ such that $c_{max}/c_{min} \leq 10$, by choosing for each diffraction grating 13$a$3, 13$b$3, 13$c$3 a distinct pitch adapted to said restricted range of concentration for each type of element to detect. Indeed, the absorptivity parameter of an incident radiation by an element strongly depends on the wavelength of the incident radiation.

According to an alternative of the second embodiment:
the light source 11' emits a light beam at at least one first wavelength hi corresponding to an absorption length of a first element to detect, and a second wavelength $\lambda_2$ distinct from $\lambda_1$ and corresponding to an absorption wavelength of a second element to detect, and
the detection device 10' comprises at least first and second pluralities of optical waveguides such as described previously, the pitches of the diffraction gratings of the first plurality of waveguides being chosen to enable the detection of the first element to detect over a wide range of concentration such as described previously, and the pitches of the diffraction gratings of the second plurality of waveguides being chosen to enable the detection of the second element to detect over a wide range of concentration such as described previously.

Figure 3A:
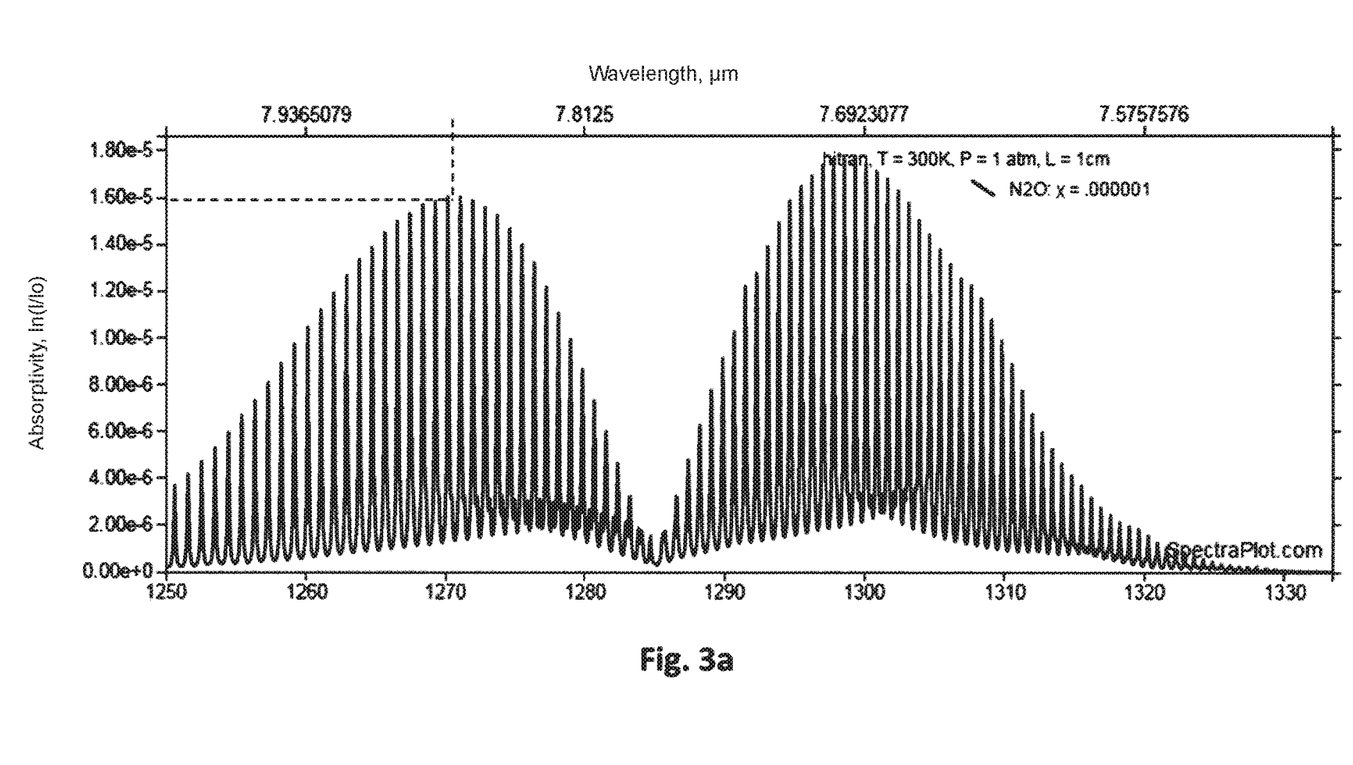
FIG. 3a shows a graph of absorptivity as a function of wavelength in the example of $N_2O$ gas, for a given concentration and length of interaction.
Figure 3B:
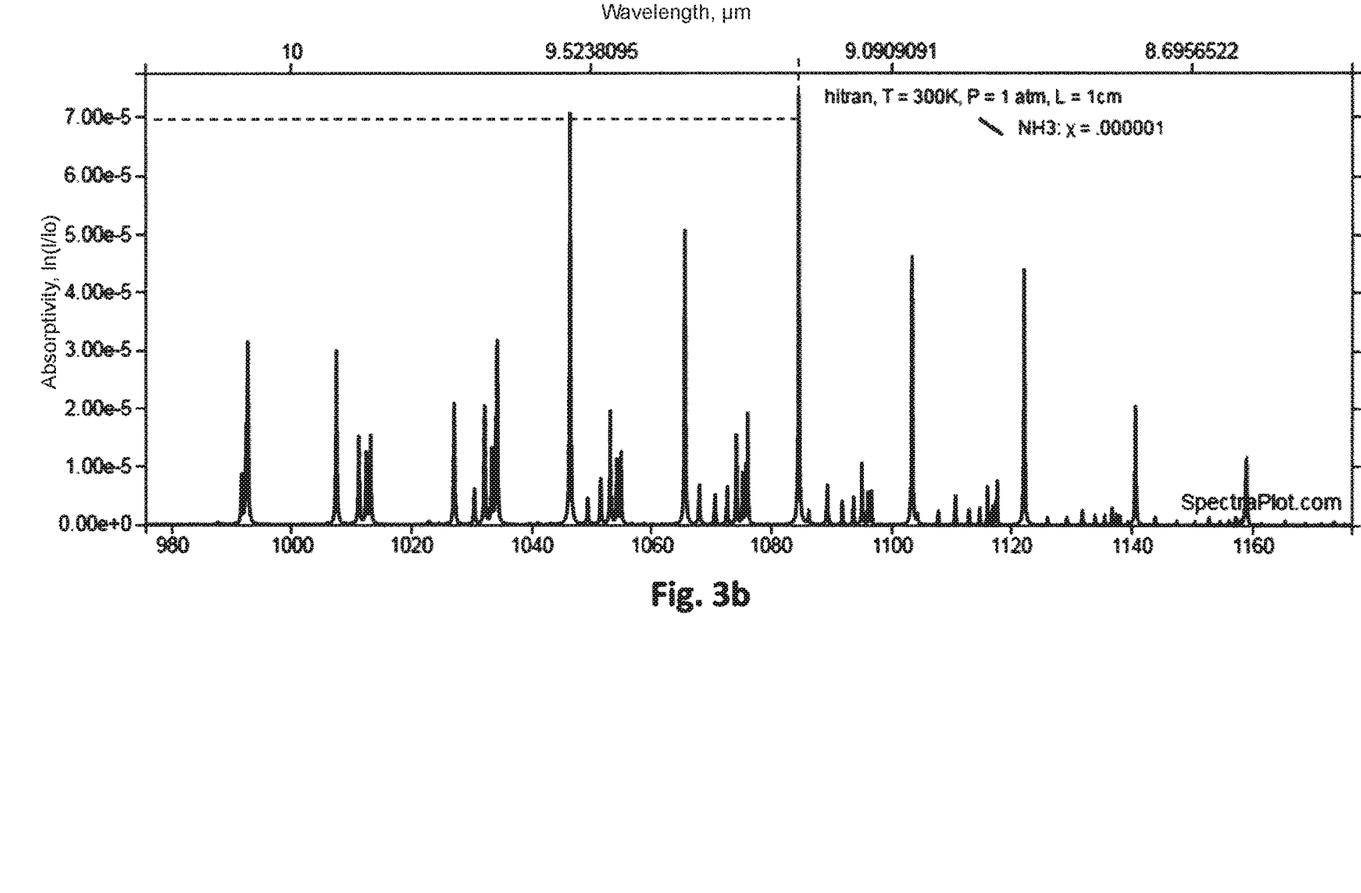
FIG. 3b shows a graph of absorptivity as a function of wavelength in the example of $NH_3$ gas, for a given concentration and length of cavity.

FIGS. 3$a$, 3$b$, 4$a$, 4$b$, 5$a$, 5$b$, 6$a$, 6$b$ describe an example of dimensioning of a detection device according to an aspect of the invention, having to serve for the detection of two gases: $N_2O$ gas and $NH_3$ gas.

FIG. 3$a$ shows a graph of the absorptivity of $N_2O$ gas as a function of wavelength, for a concentration of 1 ppm and an interaction length of 1 cm. FIG. 3$b$ shows a graph of the absorptivity of $NH_3$ gas as a function of wavelength, also for a concentration of 1 ppm and an interaction length of 1 cm. The graph of FIG. 3$a$ makes it possible to determine a wavelength of interest $\lambda_{N2O}$ for $N_2O$ gas, such that $\lambda_{N2O}=7.85$ μm, corresponding to an absorptivity ($N_2O$ of 1.6 $e^{-5}$ ppm$^{-1}$·cm$^{-1}$. In an analogous manner, the graph of the FIG. 3$b$ makes it possible to determine a wavelength of interest $\lambda_{NH3}$ for $NH_3$ gas, such that $\lambda_{NH3}=9.22$ μm, corresponding to an absorptivity $\alpha_{NH3}$ of 7 $e^{-5}$ ppm$^{-1}$·cm$^{-1}$.

It is possible to use several wavelengths for each gas or element to detect, each wavelength corresponding to a different absorption peak of the gas or element to detect. This makes it possible to decrease or eliminate the risk of false positives during detection, which exists when two different gases have one or more absorption peaks in common.

Figure 4A:
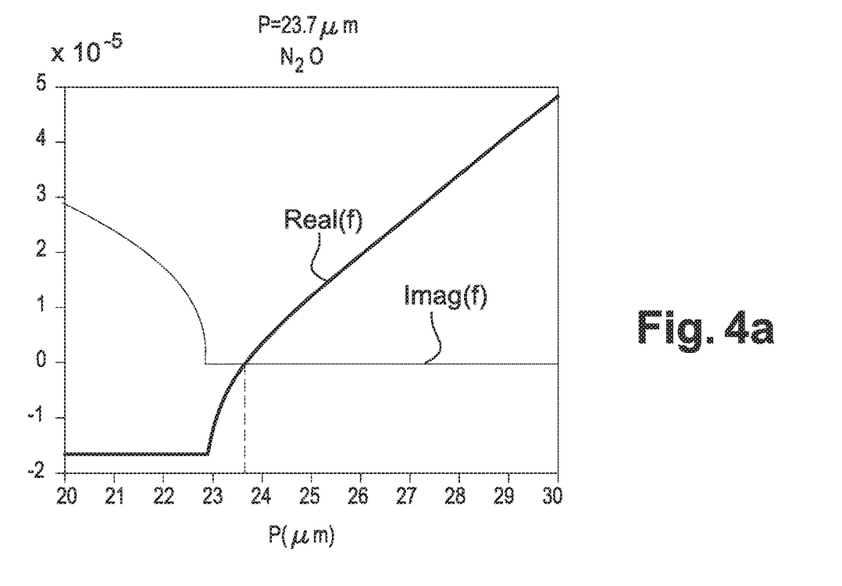
FIG. 4a shows a graph of a function f as a function of the period P of a diffraction grating in the example of $N_2O$ gas.
Figure 4B:
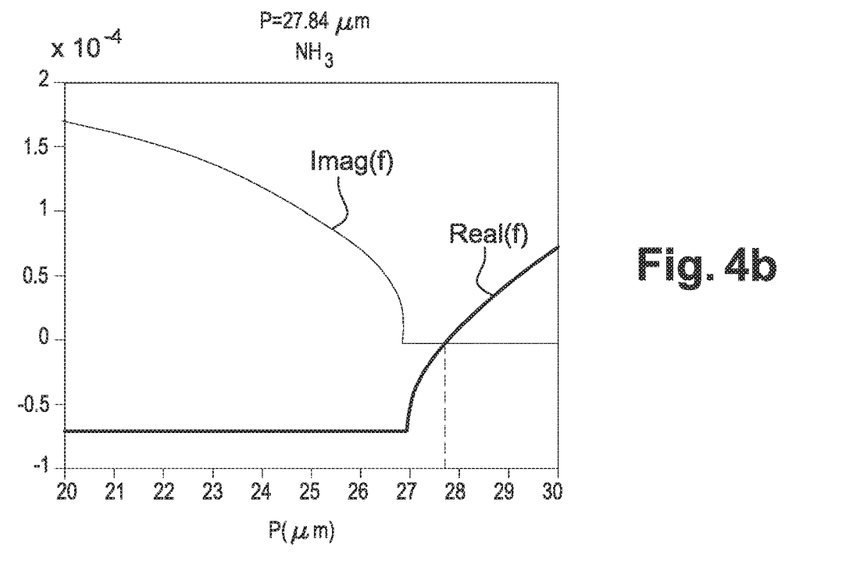
FIG. 4b shows a graph of a function f as a function of the period P of a diffraction grating in the example of $NH_3$ gas.

In this example, each monomode optical waveguide has a core made of Ge, of index $n_c=4$, and a cladding made of SiGe with 40% of Ge, of index n=3.6, and is transparent to the wavelengths of interest. For the considered technology and the wavelengths of interest, typically a thickness of 2.5 μm is chosen for each optical waveguide. The effective index of the mode propagated within each optical waveguide is substantially equal to 3.8. A cavity of height H=725 μm is considered, corresponding to the thickness of a silicon substrate, and of length L=1 cm. A reflection rate of 98% is considered for the first and second reflective walls of the cavity, characteristic of gold at the wavelengths of interest. Finally, a typical detection concentration of 1 ppm for each of the two gases of interest is targeted. FIG. 4$a$ shows a graph of the function f, with its real part Real(f) and its imaginary part Imag(f), as a function of the period P of a diffraction grating, for $N_2O$ gas with the parameters chosen above. FIG. 4$b$ shows a graph of the function f, with its real part Real(f) and its imaginary part Imag(f), as a function of the period P of a diffraction grating, for $NH_3$ gas with the parameters chosen above. A non-zero imaginary part signifies that the light beam extracted by the diffraction grating undergoes a total internal reflection at the interface between the solid optical waveguide and the hollow cavity, filled with air. The graph of FIG. 4$a$ makes it possible to determine the period $P_{N2O}$ such that $f(P_{N2O})=0$: $P_{N2O}=23.7$ μm. In an analogous manner, the graph of FIG. 4$b$ makes it possible to determine the period $P_{NH3}$ such that $f(P_{NH3})=0$: $P_{NH3}=27.84$ μm.

Figure 5A:
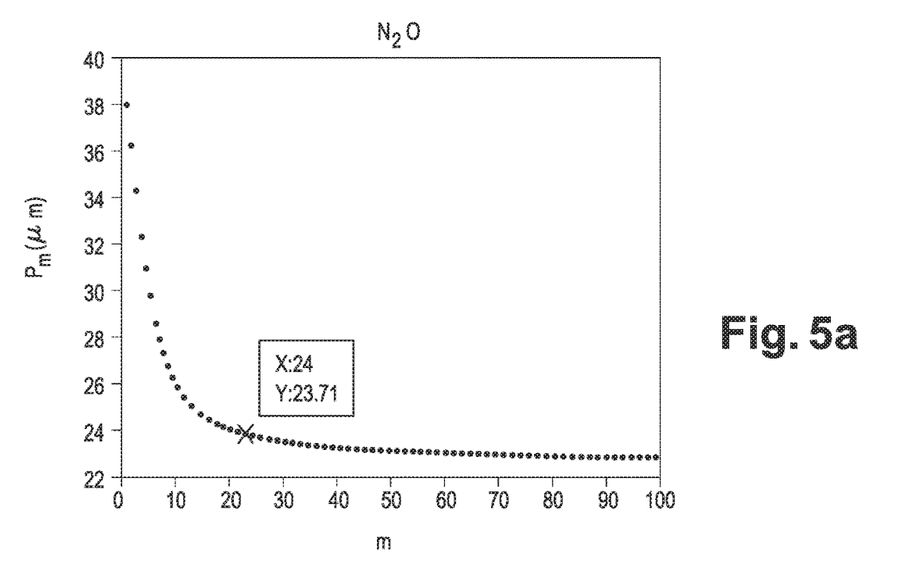
FIG. 5a shows a graph of the terms of a series $(P_m)$ in the example of $N_2O$ gas.
Figure 5B:
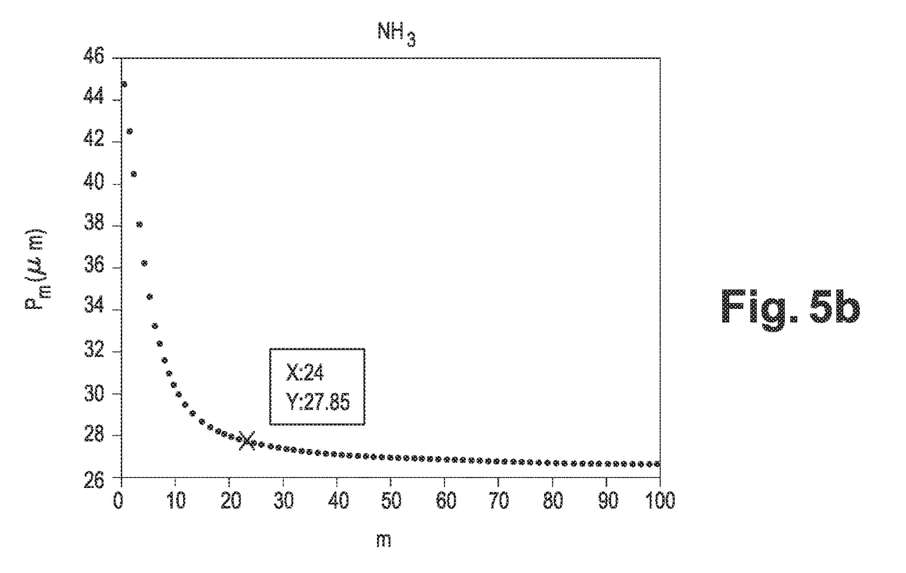
FIG. 5b shows a graph of the terms of a series $(P_m)$ in the example of $NH_3$ gas.

In the particular case of a detection device by light attenuation, it now involves seeking, for each gas, the period of the diffraction grating belonging to the series $(P_m)$ which is the closest to the period cancelling the function f. To do so, FIG. 5$a$ shows a graph of the terms of the series $(P_m)$ as a function of m in the example of $N_2O$ gas with the parameters chosen above, and FIG. 5$b$ shows a graph of the terms of the series $(P_m)$ as a function of m in the example of $NH_3$ gas with the parameters chosen above. The graph of FIG. 5$a$ makes it possible to determine the period $P_{N2O\_d}$ belonging to the series $(P_m)$ and minimising the norm of the function f in the case of $N_2O$ gas: $P_{N2O\_d}=23.71$ μm for m=24. In an analogous manner, the graph of FIG. 5$b$ makes it possible to determine the period $P_{NH3\_d}$ belonging to the series $(P_m)$ and minimising the norm of the function f in the case of $NH_3$ gas: $P_{NH3\_d}=27.85$ μm.

Figure 6A:
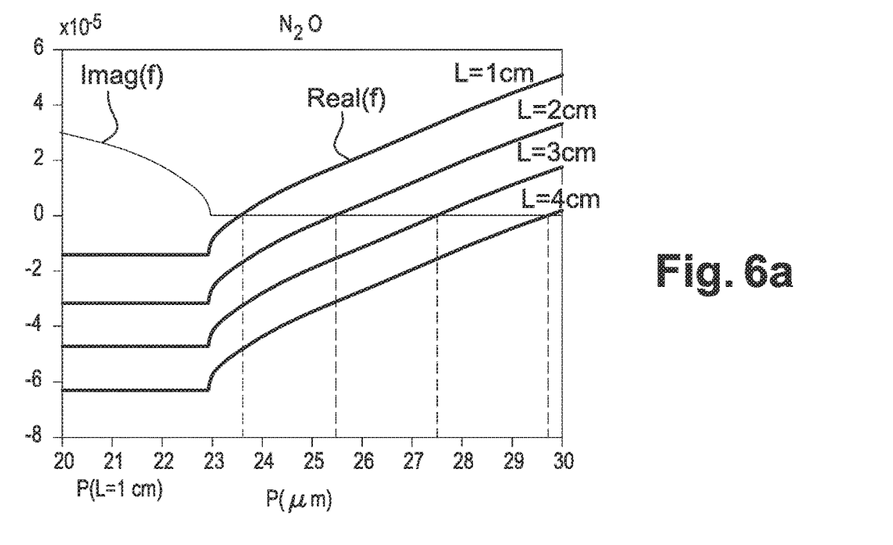
FIG. 6a shows, in the example of $N_2O$ gas, several graphs of the function f for several different values of cavity length.
Figure 6B:
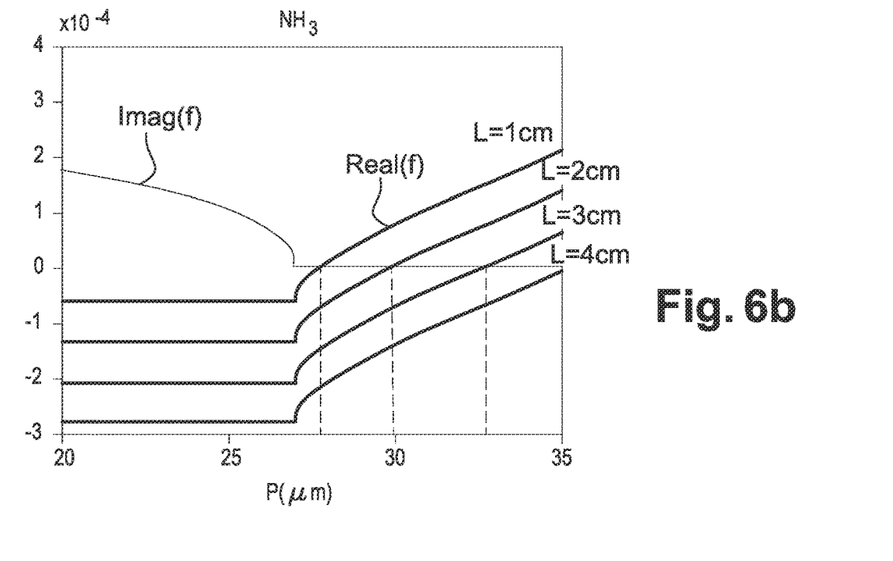
FIG. 6b shows, in the example of $NH_3$ gas, several graphs of the function f for several different cavity length values.

FIGS. 6$a$ and 6$b$ show the impact of a variation in the length L of the cavity over the period to choose, in the case of $N_2O$ gas and in that of $NH_3$ gas, respectively. An increase in the length L of the cavity leads to an increase in the required period of the diffraction gratings.

FIGS. 7$a$ to 7$f$, 8$a$ to 8$e$ and 9, which show the steps of a method for manufacturing 100 a device for detecting gases or particles according to an embodiment of the invention, will now be described.

FIG. 7$a$ shows a first substrate su1, for example a silicon substrate to use later an infrared interaction light, or a $SiO_2$ glass substrate to use later a visible interaction light. The first substrate su1 has a first part sp1 and a second part sp2. The first part sp1 forms a first cladding layer g1 of an optical waveguide.

FIG. 7$b$ shows a step of etching, in a first part sp1 of the first substrate su1, a diffraction grating rd having a pitch P.

FIG. 7$c$ shows a step of depositing, on the first cladding layer g1 and on the diffraction grating rd etched in the first clad layer g1, a core layer c of the optical waveguide. The core layer is for example a layer of Ge when the first substrate is made of Si, or a layer of silicon nitride when the first substrate is made of $SiO_2$. A step of chemical mechanical planarization CMP may be provided at the end of the deposition step 7$c$.

FIG. 7$d$ shows a step of depositing, on the core layer c and on the second part sp2 of the first substrate su1, a quarter wave layer, for example made of SiGe when the core layer is made of Ge, which forms a second cladding layer g2 directly in line with the core layer c. FIG. 7$d$ also shows a step of depositing, on the quarter wave layer, a first reflective layer r1, for example metallic. Even if the sectional representations of FIGS. 7$a$ to 7$d$ only show a single optical waveguide, a plurality of optical waveguides are produced during these steps.

Figure 7A:
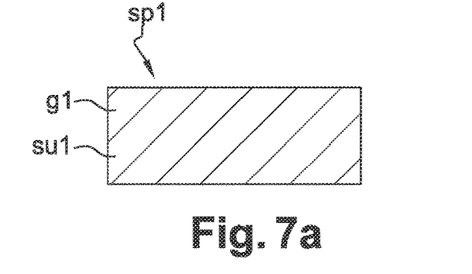
FIGS. 7a to 7f show the steps of a method for manufacturing a first part of a device for detecting gases or particles according to an aspect of the invention.
Figure 7B:
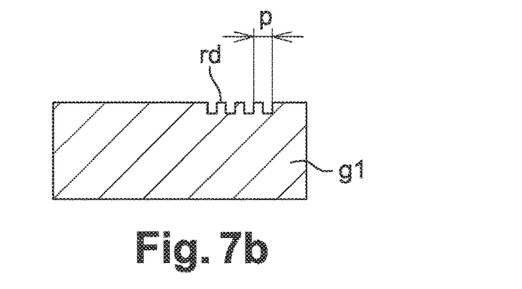
Figure 7C:
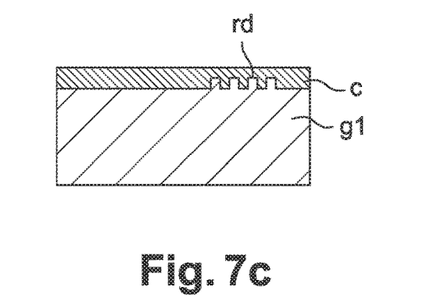
Figure 7D:
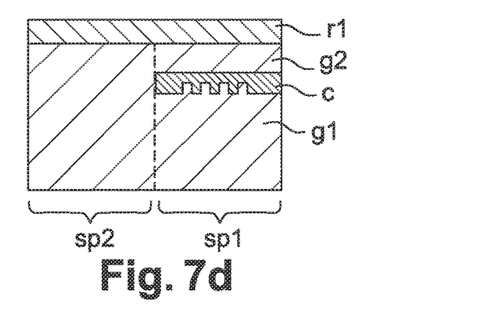

FIG. 7d' shows a step of turning over the device of FIG. 7d.

Figure 7E:
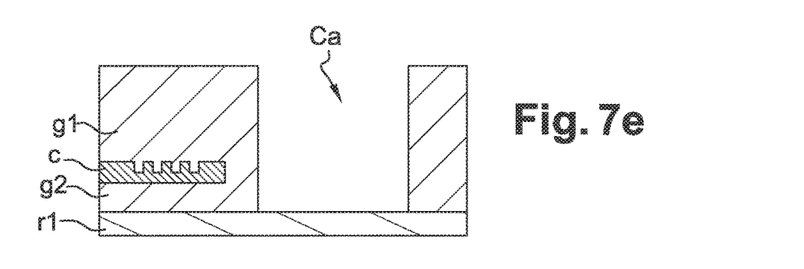

FIG. 7e shows a step of etching a cavity Ca in the second part of the first substrate su1, so as to emerge on the first reflective layer r1. At this stage, the cavity Ca comprises a wall formed by the first substrate su1 and a wall formed by the first reflective layer r1.

Figure 7F:
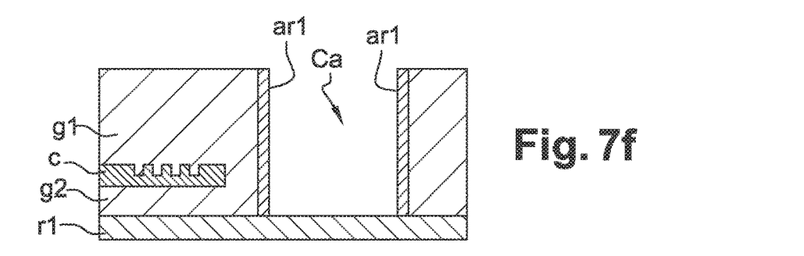

FIG. 7f shows, in the case of a later use of infrared interaction light, a step of depositing a first antireflective layer ar1 on the wall of the cavity Ca formed by the first substrate su1. This step is optional in the case of a later use of visible interaction light. The first antireflective layer ar1 is typically deposited both on the wall of the cavity Ca formed by the first substrate su1 and on the wall of the cavity Ca formed by the first reflective layer r1, then removed from the wall formed by the first reflective layer r1 by an anisotropic etching technique.

Figure 8A:
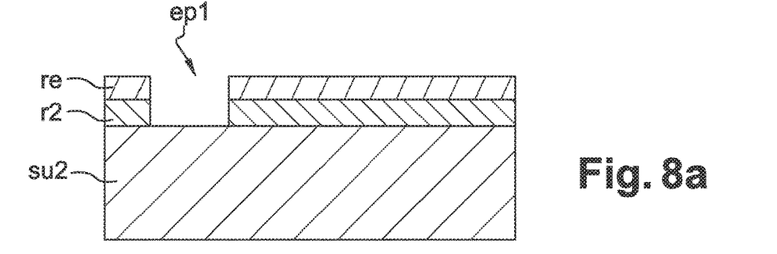
FIGS. 8a to 8e show the steps of a method for manufacturing a second part of a device for detecting gases or particles according to an aspect of the invention.

FIG. 8a shows a second substrate su2, for example a silicon substrate to use later an infrared interaction light, or a substrate made of $SiO_2$ glass to use later a visible interaction light. A second reflective layer r2 is deposited on the second substrate su2 then a first location ep1 emerging on the second substrate su2 is opened in the second reflective layer r2, using a resin mask re.

Figure 8B:
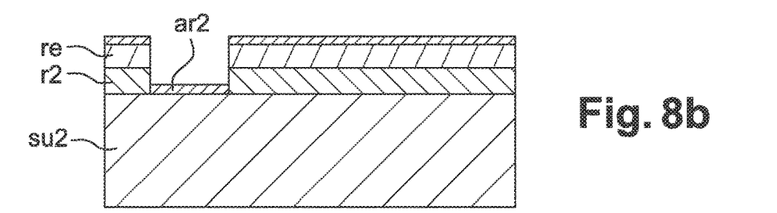
Figure 8C:
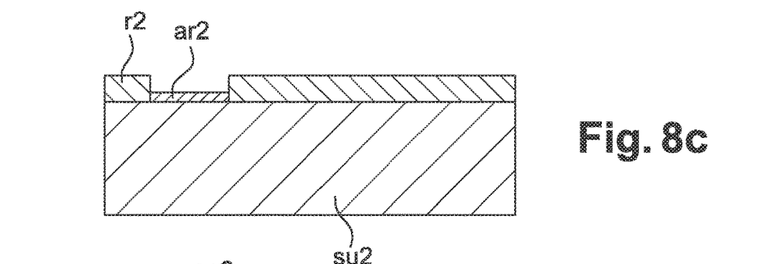

FIG. 8b shows, in the case of a later use of infrared interaction light, a step of depositing a second antireflective layer ar2 in the first location ep1. This step is optional in the case of a later use of visible interaction light. The second antireflective layer ar2 is typically deposited both in the first location ep1 and on the resin mask re, then the resin mask re is removed during a lift-off step.

Figure 8D:
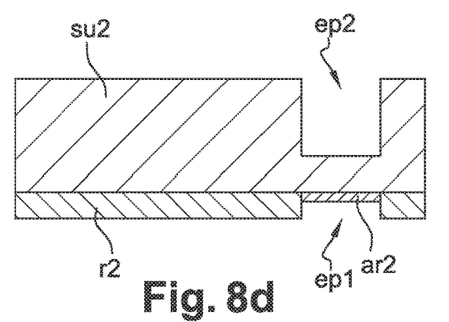

FIG. 8d shows a step of turning over the device of FIG. 8b, followed by a step of etching, in the second substrate su2 and directly in line with the first location ep1, a second location ep2 intended to receive the detector 14.

When step 8b has been carried out and when a second antireflective layer ar2 has been deposited in the first location ep1, the second location ep2 is etched so as to conserve a residue of the second substrate su2 directly in line with the first location ep1. The residue of the second substrate su2 makes it possible to protect the antireflective layer ar2 by preventing it from breaking, while ensuring a good later mechanical maintaining of the detector 14, when it is arranged in the second location ep2. The residue of the second substrate su2 is preferably at least 10 μm thick.

When step 8b has not been carried out, the second location ep2 is preferentially etched so as to conserve the residue of the second substrate su2, such as described previously. A good later mechanical maintaining of the detector 14 is thereby ensured. Alternatively, the second location ep2 may be etched directly in line with the first location ep1 so as to traverse the second substrate su2 and to emerge on the first location ep1. In this alternative, a means for maintaining the detector 14 are provided in order that it does not penetrate into the cavity 12.

Figure 8E:
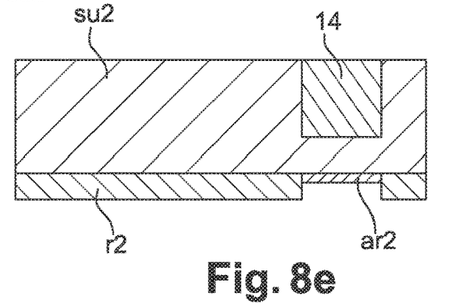

FIG. 8e shows a step of arranging the detector 14 in the second location ep2.

Figure 9:
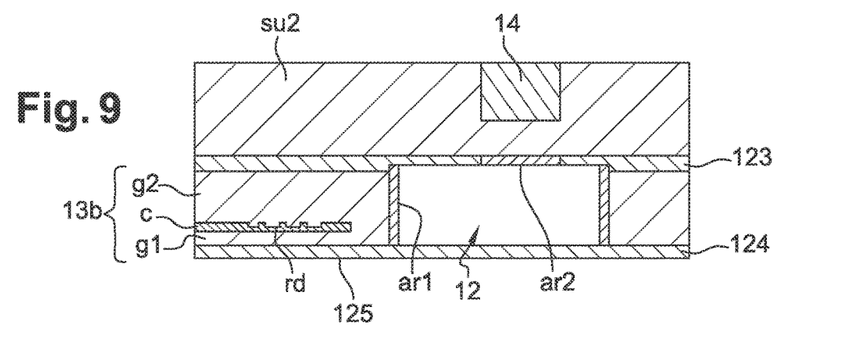
FIG. 9 shows a step of assembling the first part obtained at the end of the steps of FIGS. 7a to 7f with the second part obtained at the end of the steps 8a to 8e, to obtain a device for detecting gases or particles according to an aspect of the invention.

FIG. 9 shows a step of assembling the device obtained at the end of the steps of FIGS. 7a to 7f with the device obtained at the end of the steps 8a to 8e, to obtain a device for detecting gases or particles 10, 10' according to an aspect of the invention. The assembly is typically a step of Si/Au eutectic sealing. The first and second substrates su1, su2 are assembled in such a way that the first and second reflective layers r1, r2 are facing each other, thereby forming the first and second reflective walls 123, 124 of the cavity 12 such as described previously. The first and second locations ep1, ep2 are aligned and directly in line with the cavity 12. The core layer intercalated between the first and second cladding layers g1, g2 and comprising the diffraction grating rd at the interface between the core layer c and the first cladding layer g1 forms the optical waveguide 13b such as described previously. Alternatively, each diffraction grating rd could be situated at the interface between the core layer c and the second cladding layer g2. In this alternative, each diffraction grating is not etched in the first cladding layer g1 but in the core layer c which is deposited on the first cladding layer g1.

Figure 10:
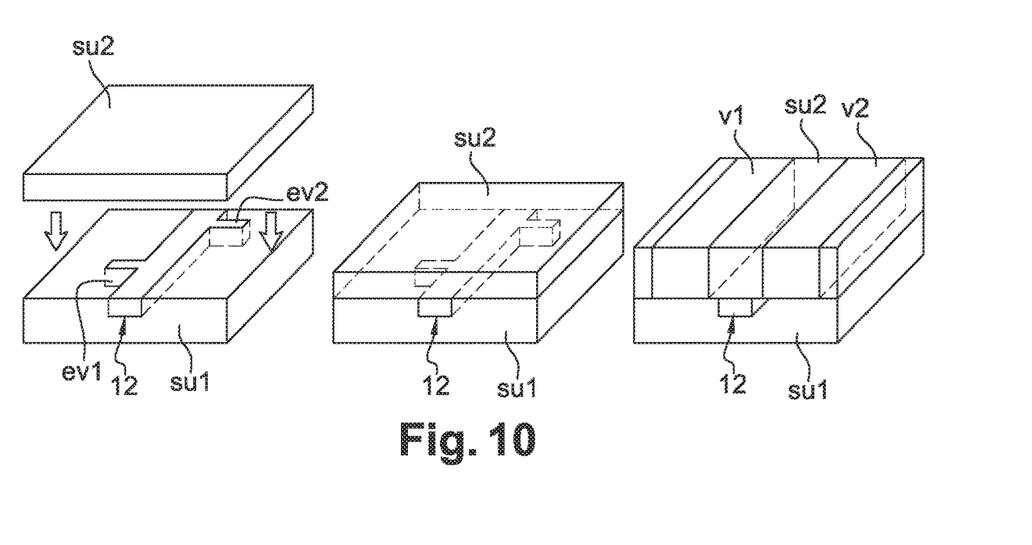
FIG. 10 shows particularly a step of opening vents within a device for detecting gases or particles according to an aspect of the invention.

FIG. 10 shows particularly a step of opening vents within a device for detecting gases or particles according to an aspect of the invention. First and second vents ev1, ev2 are etched in the second part of the first substrate su1, in such a way that they emerge on the cavity Ca. The cavity and the vents are typically produced at the same time, during a same technological step. The assembly of the first and second substrates su1, su2 closes the cavity and the first and second vents. A step of etching a first volume v1 of the second substrate su2 is then provided so as to open the first vent ev1, and etching a second volume v2 of the second substrate su2 so as to open the second vent ev2.

Figure 11A:
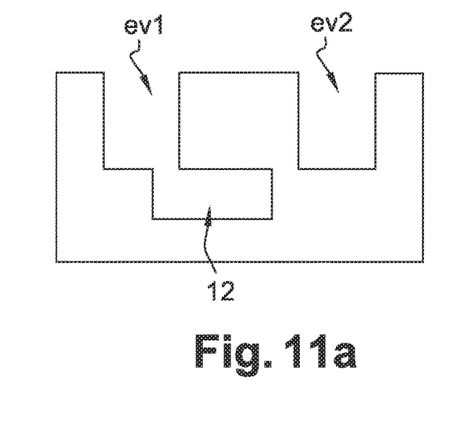
FIG. 11a is a sectional view showing in particular a first vent emerging in a cavity of a device for detecting gases or particles according to an aspect of the invention.
Figure 11B:
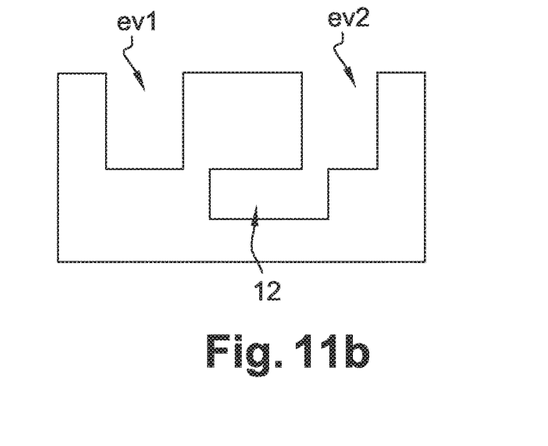
FIG. 11b is a sectional view showing in particular a second vent emerging in a cavity of a device for detecting gases or particles according to an aspect of the invention.

FIG. 11a is a sectional view showing in particular the first vent ev1 emerging in the cavity 12 of a device for detecting gases or particles 10, 10' according to an aspect of the invention, after the step of etching the first and second volumes v1, v2, described in FIG. 10. FIG. 11b is a sectional view showing in particular the second vent ev2 emerging in the cavity 12 of a device for detecting gases or particles 10, 10' according to an aspect of the invention, after the step of etching the first and second volumes v1, v2, described in FIG. 10.

The invention claimed is:

1. Device for detecting gases or particles comprising:
a light source adapted to emit a light beam at at least one wavelength,
a cavity for interaction of gases or particles with the light beam comprising first and second reflective walls substantially parallel with each other and facing each other,
a plurality of monomode optical waveguides each having a first end having a first width optically coupled to the light source and a second end having a second width, the second width being greater than the first width, optically coupled to a first end of the interaction cavity, each optical waveguide comprising in its second width a diffraction grating having a distinct pitch P chosen as a function of the wavelength λ of the light beam propagated in the optical waveguide associated with said diffraction grating, the cladding index n of the optical waveguide associated with the diffraction grating, the effective index $n_{eff}$ of the mode propagated in the optical waveguide associated with the diffraction grating, the length L and the height H of the cavity, the reflection rate R of the first and second reflective walls of the cavity for the light beam at the wavelength λ, a concentration C of a type of gas or particle to detect and a parameter α of interaction of the type of gas or particle to detect with the light beam;
and a detector coupled to a second end of the interaction cavity.

2. The device for detecting gases or particles according to claim 1, wherein the pitch P is chosen so as to minimise the norm of the following equation:

$$f(P) = \ln\left(1 + \frac{\alpha HC}{\sqrt{n^2 - \left(n_{\text{eff}} - \frac{\lambda}{P}\right)^2}\ln\left(\frac{1}{R}\right)}\right)\sqrt{1 - n^2 + \left(n_{\text{eff}} - \frac{\lambda}{P}\right)^2} - \alpha LC.$$

3. The device for detecting gases or particles according to claim 1, further comprising at least one first diffraction grating having a first pitch, and a second diffraction grating having a second pitch distinct from the first pitch.

4. The device for detecting gases or particles according to claim 1, wherein each monomode optical waveguide has a core layer intercalated between first and second cladding layers, wherein the device further comprises a reflective layer in the extension of the second reflective wall, and wherein the first cladding layer is arranged on said reflective layer and has a thickness e such that:

$$\frac{\lambda_{av}}{8n} \leq e \leq \frac{3\lambda_{av}}{8n}$$

where $\lambda_{av}$ is the average wavelength of all the wavelengths used and n is the index of the first cladding layer.

5. The device for detecting gases or particles according to claim 1, further comprising first and second vents communicating with the interaction cavity.

6. The device for detecting gases or particles according to claim 1, wherein:
the interaction cavity is an optical cavity,
the detector is a light detector and is arranged substantially parallel to the reference plane, in the plane of the first reflective wall,
the pitch P of each diffraction grating further belongs to the series, with m a natural integer, such that:

$$P_m = \frac{\lambda}{n_{\text{eff}} - \sqrt{n^2 - \frac{(2m+1)^2}{(2m+1)^2 + \left(\frac{L}{H}\right)^2}}}$$

the diffraction gratings extend substantially along a same plane and each diffraction grating of pitch P has a plurality of structures parallel with each other, spaced apart by the pitch P, and perpendicular to a radial direction relative to the light detector.

7. The device for detecting gases or particles according to claim 1, wherein:
the interaction cavity is an optical cavity,
the detector is a light detector and is arranged substantially parallel to the reference plane, in the plane of the second reflective wall,
the pitch P of each diffraction grating further belongs to the series, with m a natural integer, such that:

$$P_m = \frac{\lambda}{n_{\text{eff}} - \sqrt{n^2 - \frac{(2m+2)^2}{(2m+2)^2 + \left(\frac{L}{H}\right)^2}}}$$

the diffraction gratings extend substantially along a same plane and each diffraction grating of pitch P has a plurality of structures parallel with each other, spaced apart by the pitch P, and perpendicular to a radial direction relative to the light detector.

8. The device for detecting gases according to claim 1, wherein the parameter of interaction of the type of gas or particle to detect with the light beam is an absorptivity parameter α and wherein the light source is adapted to emit a light beam at at least one first wavelength corresponding to an absorption wavelength of a first gas to detect, and at at least one second wavelength distinct from the first wavelength and corresponding to an absorption wavelength of a second gas to detect.

9. Method for manufacturing a device for detecting gases or particles comprising a light source adapted to emit a light beam at at least one wavelength λ, a cavity for interaction of gases or particles with the light beam comprising first and second reflective walls substantially parallel with each other, a plurality of monomode optical waveguides each having a first end with a first width optically coupled to the light source and a second end having a second width, the second width being greater than the first width, optically coupled to a first end of the interaction cavity, and a detector coupled to a second end of the interaction cavity, the method comprising:
in a first part of a first substrate, producing the plurality of monomode optical waveguides, each optical waveguide comprising a core layer intercalated between first and second cladding layers, as well as a diffraction grating arranged at an interface between the core layer and one of the first or second cladding layers, each diffraction grating having a distinct pitch P chosen as a function of the wavelength λ of the light beam propagated in the optical waveguide associated with said diffraction grating, the cladding index n of the optical waveguide associated with the diffraction grating, the effective index $n_{\text{eff}}$ of the mode propagated in the optical waveguide associated with the diffraction grating, the length L and the height H of the cavity, the reflection rate R of the first and second reflective walls of the cavity for the light beam at the wavelength λ, a concentration C of a type of gas or particle to detect and a parameter a of interaction of the type of gas or particle to detect with the light beam;
depositing a first reflective layer on the plurality of optical waveguides produced in the first part of the first substrate and on a second part of the first sub state;
etching, in the second part of the first substrate, a cavity emerging on the first reflective layer;
on a second substrate, depositing a second reflective layer;
etching, in the second reflective layer and in the second substrate, a location intended to receive the detector;
assembling the first and second substrates in such a way that:
the first and second reflective layers are facing each other,
the location intended to receive the detector lies directly in line with the cavity,
the plurality of optical waveguides lies between the first and second reflective layers.

10. The method according to claim 9, wherein:
the method comprises, after the step of etching, in the second part of the first substrate, a cavity emerging on the first reflective layer, a step of depositing, on the first substrate forming a wall of the previously etched cavity, a first antireflective layer, and the step of etching the location intended to receive the detector comprises the following three sub-steps:
   etching, in the second reflective layer, a first location emerging on the second substrate;
   depositing, on the second substrate emerging in the first location, a second antireflective layer;
   etching, in the second substrate, a second location intended to receive the detector.

11. The method according to claim 9, further comprising:
   a step of etching, in the second part of the first substrate, at least first and second vents emerging on the cavity etched in the second part of the first substrate;
   after the assembly of the first and second substrates, a step of etching the second substrate so as to emerge on the first and second vents, without emerging on the cavity.

* * * * *